J. S. FINLAY.
CONCENTRATOR.
APPLICATION FILED APR. 15, 1912.
1,080,053.
Patented Dec. 2, 1913.
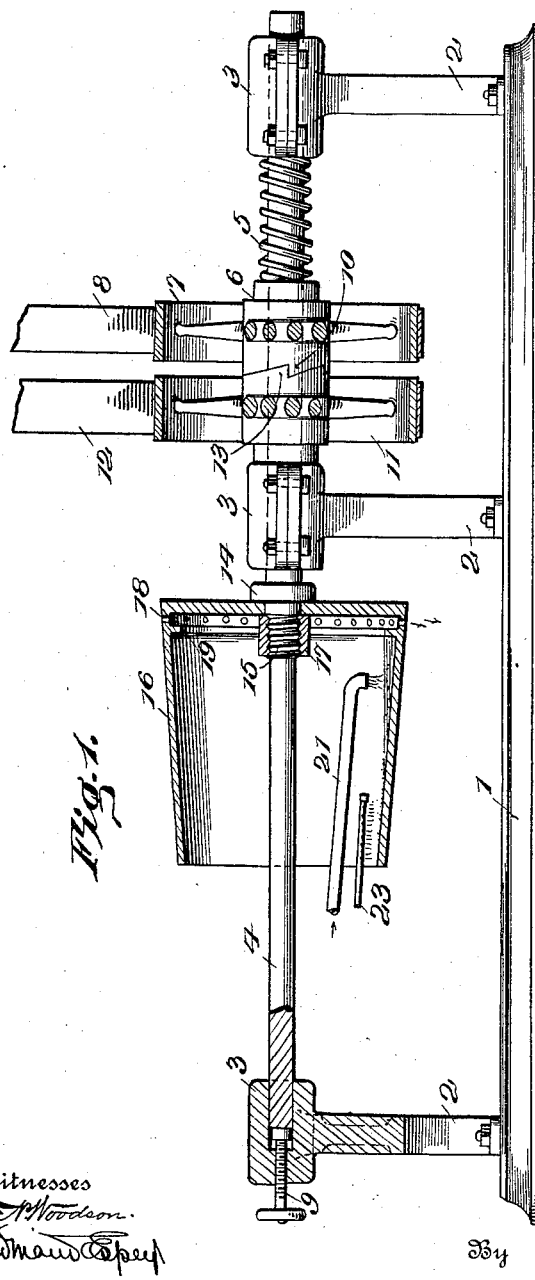
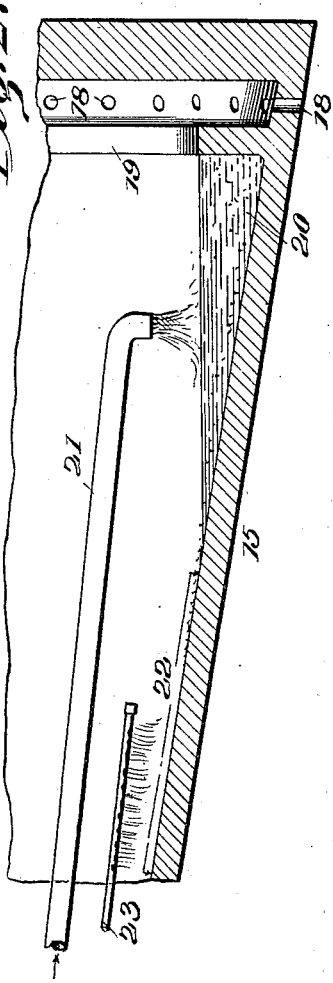
Witnesses
Inventor
J. S. Finlay.
By
Attorneys

UNITED STATES PATENT OFFICE.

JOHN S. FINLAY, OF WALLACE, IDAHO.

CONCENTRATOR.

1,080,053.   Specification of Letters Patent.   Patented Dec. 2, 1913.

Application filed April 15, 1912.  Serial No. 690,918.

*To all whom it may concern:*

Be it known that I, JOHN S. FINLAY, citizen of the United States, residing at Wallace, in the county of Shoshone and State of Idaho, have invented certain new and useful Improvements in Concentrators, of which the following is a specification.

My invention relates to concentrators and has for its object the provision of a simple and inexpensive device by which the constituent elements of the material to be treated will be separated through centrifugal action, and the concentrates and tailings continuously and simultaneously discharged.

The invention also seeks to combine in a single instrumentality the means for separating the elements and for discharging the less valuable particles, while retaining the more valuable.

The invention is fully illustrated in the accompanying drawings and will be hereinafter fully described, the novel features being subsequently pointed out in the appended claims.

In the drawings: Figure 1 is a sectional elevation of a concentrator embodying my invention. Fig. 2 is an enlarged detailed section of a portion of the drum.

In carrying out my invention, I employ a suitable supporting frame which, in the present instance, is illustrated as comprising a base 1 and a plurality of alined standards 2 rising therefrom and equipped with journal boxes or other form of bearings 3 at their upper ends, in which the driving shaft 4 is mounted. This driving shaft is loosely mounted in the bearings so that it may not only rotate freely therein, but also be capable of an axial reciprocation, and it is normally held toward one end bearing by a spring 5 coiled around the shaft between the opposite end bearing and a stop on the shaft, which is shown as a hub 6 carrying a pulley 7, over which a driving belt 8 runs. The pulley is rigid with the shaft so that the spring acting on the hub of the same will tend to move the shaft away from the adjacent bearing, and in the opposite end bearing I provide an adjustable buffer 9 by which the extent of the reciprocation may be limited. The end of the hub 6, distant from the spring 5, is provided with a series of projections 10, preferably having outer inclined faces and meeting faces disposed parallel to the axis of the hub, so as to present abrupt shoulders. A pulley 11 is mounted loosely on the shaft adjacent the pulley 7 and a belt or driving band 12 passes around the said pulley, the hub of which is provided with projections 13, similar in form to the projections 10 on the fast pulley but reversely arranged. The opposite end of the hub of the loose pulley rests against the intermediate journal box 3 so that the said loose pulley will be prevented from moving longitudinally of the shaft. It will be readily seen that if the loose pulley be held stationary and motion be imparted to the fast pulley the shaft will be rotated, and at the same time the interengaging projections on the opposed ends of the hubs of the two pulleys will cause the fast pulley to move away from the loose pulley against the tension of the spring 5, so as to permit the projections 10 to clear the projections 13. As soon as the projections have thus been cleared the spring expands and moves the fast pulley, and the shaft to which it is secured, toward the loose pulley and a constant reciprocation of the shaft is thus effected. The rapidity of the reciprocation may be determined and varied by holding the loose pulley stationary or by driving the same simultaneously with the fixed pulley, but at a different speed, all of which will be readily understood by those skilled in the art.

Adjacent the intermediate bearing 3 an annular shoulder or stop 14 is formed on the driving shaft, and beyond the said stop or shoulder the shaft is reduced and equipped with a threaded portion 15 adjacent the said stop. The concentrating drum 16 is slipped over the reduced portion of the shaft and the threaded part 15 thereof, so as to rest against the stop 14, and a nut or threaded collar 17 is then turned home against the end of the drum so as to clamp the same securely against the said shoulder 14, as clearly shown in Fig. 1. The drum is preferably in the form of a frustum of a cone with its smaller end open and unobstructed to permit feeding into the drum of the material to be treated. Adjacent the larger end of the drum, which is shown closed so that it may be secured to the driving shaft, a series of radial openings or perforations 18 are formed through the side thereof and adjacent the said perforations is an internal annular rib 19 whereby a substantially triangular settling chamber or pocket 20 is formed within the drum.

The material to be treated is fed, together with water, through the pipe 21 leading into the drum and discharging adjacent the rib 19, that is to say, immediately over the pocket 20, the driving shaft having been set in motion so as to rotate the drum, as will be understood. The rotation of the drum causes a centrifugal action within the same, so that the excess material will be discharged through the larger end of the drum, that is to say, in the illustrated construction, over the rib 19. The reciprocation of the shaft simultaneously with its rotation will cause the concentrates held to the inner surface of the drum by the centrifugal force to flow upwardly from the pocket 20 over the inclined dressing surface 22, extending from the surface of the material within the pocket 20 to the open smaller end of the drum, and if the nature of the material demands further cleaning, a perforated water pipe 23 may be arranged to discharge a spray over the said dressing surface, as clearly shown. While this dressing surface is illustrated as being smooth, it will be unstood that it may be riffled or grooved as may be most desirable for any particular conditions under which the concentrator is operated.

The operation of the device is thought to be obvious from the foregoing description, taken in connection with the accompanying drawings.

As the drum is rotated the lighter material or tailings and the water are thrown over the retaining rib 19, and pass out through the perforations 18, while the concentrates are gradually worked toward the smaller end of the drum, from which they pass and may be caught in any convenient receptacle or otherwise treated. The particular means for effecting the reciprocation of the driving shaft is not essential, but it is desirable that the speed of revolution and of reciprocation be easily adjusted and for that reason I prefer the fast and loose pulleys having the interchanging opposed faces, as shown and described.

My device is exceedingly simple in its construction so that it may be manufactured at a slight cost and is not liable to get out of order while in use, and when in operation will continuously discharge the tailings and concentrates so that the separation of the particles will be effected rapidly and easily.

Having thus described my invention, what I claim as new is:

1. A concentrator including a horizontally disposed shaft, means for simultaneously rotating and reciprocating said shaft, a frusto-conical drum having an integral closure at its larger end and open at its smaller end axially mounted on said shaft for movement therewith and wholly unsupported and interiorly unobstructed save by said shaft, an annular rib formed integrally with and interiorly of the drum and in slightly spaced relation to the closed end thereof to provide upon one side in connection with the drum an annular treatment chamber triangular in section and upon its other side in connection with the drum and closed end thereof an annular discharge chamber, the bottom of which is inclined at the same angle as the bottom of the treatment chamber, being in fact a continuation thereof, the bottom of said discharge chamber being provided intermediate of its width with a plurality of circumferentially spaced apart radially directed discharge passages, and means for separately delivering pulp and water to the inside of the drum.

2. A concentrator including spaced bearings, a shaft journaled in said bearings and mounted for free rotary and reciprocatory movement therein, means for limiting the reciprocation of said shaft, a drum mounted upon said shaft and for movement therewith, and means for rotating and reciprocating said drum, said means including a pulley loosely mounted on the shaft and seating by one side against one of the bearings, the opposite side of said pulley being provided with circumferentially disposed inclined teeth, a second pulley keyed upon said shaft adjacent the first pulley and provided upon one side with oppositely formed circumferentially extending inclined teeth adapted to co-act with the teeth of the first pulley, a coiled spring surrounding the shaft and bearing between said second pulley and another of the shaft bearings to normally hold the pulleys in engagement with each other, means for applying power to one of said pulleys, and means for applying power to the other of said pulleys.

3. A concentrator including a horizontally disposed shaft, means for simultaneously rotating and reciprocating said shaft, a frusto-conical drum closed at its larger end and opening at its smaller end axially mounted on said shaft for movement therewith and wholly unsupported and interiorly unobstructed save by said shaft, an annular rib formed interiorly of the drum and in slightly spaced relation to the closed end thereof to provide upon one side in connection with the drum an annular treatment chamber triangular in section and upon its other side in connection with the drum and closed end thereof an annular discharge chamber, the bottom of which is inclined at the same angle as the bottom of the treatment chamber, being in fact a continuation thereof, the bottom of said discharge chamber being provided intermediate of its width with a plurality of circumferentially spaced apart radially directed discharge passages, and means for separately delivering pulp and water to the inside of the drum.

In testimony whereof I affix my signature in presence of two witnesses.

JOHN S. FINLAY. [L. S.]

Witnesses:
C. C. SAMUELS,
J. O. ELTON.